(12) United States Patent
Geiger et al.

(10) Patent No.: US 8,225,124 B2
(45) Date of Patent: Jul. 17, 2012

(54) METHOD AND SYSTEM FOR DETERMINING POWER OVER ETHERNET CLASS CAPABILITIES

(75) Inventors: Edward W. Geiger, San Martin, CA (US); Julie Hanh Phan, San Jose, CA (US); Patrick Wallace, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1021 days.

(21) Appl. No.: 12/182,580

(22) Filed: Jul. 30, 2008

(65) Prior Publication Data

US 2010/0031066 A1    Feb. 4, 2010

(51) Int. Cl.
G06F 1/26    (2006.01)
(52) U.S. Cl. .......................... 713/340; 713/320
(58) Field of Classification Search .............. 713/300, 713/320, 340
See application file for complete search history.

(56) References Cited

U.S. PATENT DOCUMENTS

| | | | | |
|---|---|---|---|---|
| 7,313,714 B1* | 12/2007 | Helfinstine et al. | ........... | 713/340 |
| 7,441,133 B2* | 10/2008 | Giat et al. | ........... | 713/300 |
| 7,552,348 B1* | 6/2009 | Lo et al. | ........... | 713/310 |
| RE40,866 E * | 8/2009 | Fung | ........... | 713/300 |
| 7,706,392 B2* | 4/2010 | Ghoshal et al. | ........... | 370/419 |
| 7,774,634 B2* | 8/2010 | Diab | ........... | 713/340 |
| 7,814,340 B2* | 10/2010 | Heath et al. | ........... | 713/300 |
| 7,849,333 B2* | 12/2010 | Schindler | ........... | 713/300 |
| 7,908,494 B2* | 3/2011 | Hussain et al. | ........... | 713/300 |
| 7,966,504 B2* | 6/2011 | Diab et al. | ........... | 713/320 |
| 8,028,175 B2* | 9/2011 | Diab et al. | ........... | 713/300 |
| 8,046,600 B2* | 10/2011 | Holle et al. | ........... | 713/300 |
| 8,051,316 B2* | 11/2011 | Roberts et al. | ........... | 713/330 |

* cited by examiner

*Primary Examiner* — Paul R Myers
*Assistant Examiner* — Trisha Vu

(57) ABSTRACT

The present invention relates generally to methods and systems for determining a class of power delivered via power sourcing equipment ("PSE") utilizing power over Ethernet ("POE") technology. Described is a method including operating an network device at a first power setting, increasing a power requirement of the network device, detecting a second power setting based on an amount of power available from a power source, the second power setting being greater than the first power setting, determining whether one or more resources of the network device is operable at the second power setting, operating the network device at the second power setting if the one or more resources is operable, and activating an alert if the one or more resources is not operable. Further described is a system including a network device operating at a first power setting, the network device increases a power requirement, a power source providing an amount of power to the network device at a second power setting, the second power setting being greater than the first power setting, and a server determining whether one or more resources of the network device is operable at the second power setting, wherein the network device operates the at the second power setting if the one or more resources is operable, and the network device activates an alert if the one or more resources is not operable.

7 Claims, 4 Drawing Sheets

FIG. 3

Table 300

| Class | $P_{MIN}$ | $P_{MAX}$ | $I_{CLASS}$ (MIN) | $I_{CLASS}$ (MAX) | $R_{CLASS}$ |
|---|---|---|---|---|---|
| 0 | 0.44 W | 12.95 W | 0 mA | 4 mA | Open |
| 1 | 0.44 W | 3.84 W | 9 mA | 12 mA | 150 Ω |
| 2 | 3.84 W | 6.49 W | 17 mA | 20 mA | 82.5 Ω |
| 3 | 6.49 W | 12.95 W | 26 mA | 30 mA | 53.6 Ω |
| 4 | 12.95 W | 30.00 W | 36 mA | 44 mA | 38.3 Ω |

METHOD AND SYSTEM FOR DETERMINING POWER OVER ETHERNET CLASS CAPABILITIES

FIELD OF INVENTION

The present invention relates generally to methods and systems for determining a class of power delivered via power sourcing equipment ("PSE") utilizing power over Ethernet ("POE") technology. Specifically, the methods and systems may determine which resources of a powered device are available for use based on the determined power available from PSE to which the powered device is connected.

BACKGROUND

Power over Ethernet, or "POE", technology transmits electrical power, along with data, to remote devices over standard cable within an Ethernet network. POE technology is useful for powering devices such as Voice over Internet Protocol ("VoIP") telephones, Wireless Local Area Network ("WLAN") access points, network cameras, remote network switches, embedded computers, as well as other appliances. A POE system may be implemented where it would otherwise be inconvenient, expensive or infeasible to supply power separately. The technology is somewhat comparable to Plain-Old Telephone Service ("POTS") telephones, which also receive power and data, although analog, through the same cable.

The Institute of Electrical and Electronics Engineers ("IEEE") 802.3 standards define a physical layer, as well as a media access control ("MAC") sub-layer of the data link layer, of wired Ethernet. Physical connections are made between nodes and/or infrastructure devices (e.g., hubs, switches, routers, etc.) by various types of copper or fiber cable. Accordingly, a network switch may provide a proper forwarding of signals to various network components. The network switch may also provide power to the various network components. As mentioned above, a POE system may transmit electrical power, along with data, to these remote devices in an Ethernet network. For example, an access point ("AP") may be powered using POE from the network switch.

SUMMARY OF THE INVENTION

The present invention relates generally to a method for determining a class of power delivered via power sourcing equipment ("PSE") utilizing power over Ethernet ("POE") technology. The method includes operating an network device at a first power setting, increasing a power requirement of the network device, detecting a second power setting based on an amount of power available from a power source, the second power setting being greater than the first power setting, determining whether one or more resources of the network device is operable at the second power setting, operating the network device at the second power setting if the one or more resources is operable, and activating an alert if the one or more resources is not operable.

The present invention further relates generally to a system for determining a class of power delivered via power sourcing equipment ("PSE") utilizing power over Ethernet ("POE") technology. A system includes a network device operating at a first power setting, the network device increases a power requirement, a power source providing an amount of power to the network device at a second power setting, the second power setting being greater than the first power setting, and a server determining whether one or more resources of the network device is operable at the second power setting, wherein the network device operates the at the second power setting if the one or more resources is operable, and the network device activates an alert if the one or more resources is not operable.

The present invention further relates generally to a device for determining a class of power delivered via power sourcing equipment ("PSE") utilizing power over Ethernet ("POE") technology. A device includes an operating means for operating at a first power setting, a power increasing means for increasing a power requirement of the device, a power detecting means for detecting a second power setting based on an amount of power available from a power source, the second power setting being greater than the first power setting, a determining means for determining whether one or more resources of the device is operable at the second power setting, wherein the operating means operates the device at the second power setting if the one or more resources is operable, and an alerting means for activating an alert if the one or more resources is not operable.

DESCRIPTION OF THE DRAWINGS

FIG. 3 shows a table a of predetermined number of power classes, or the classification power levels, relating to an allocation of power to the AP from the PSE device according to an exemplary embodiment of the present invention.

DETAILED DESCRIPTION

Figure 1:
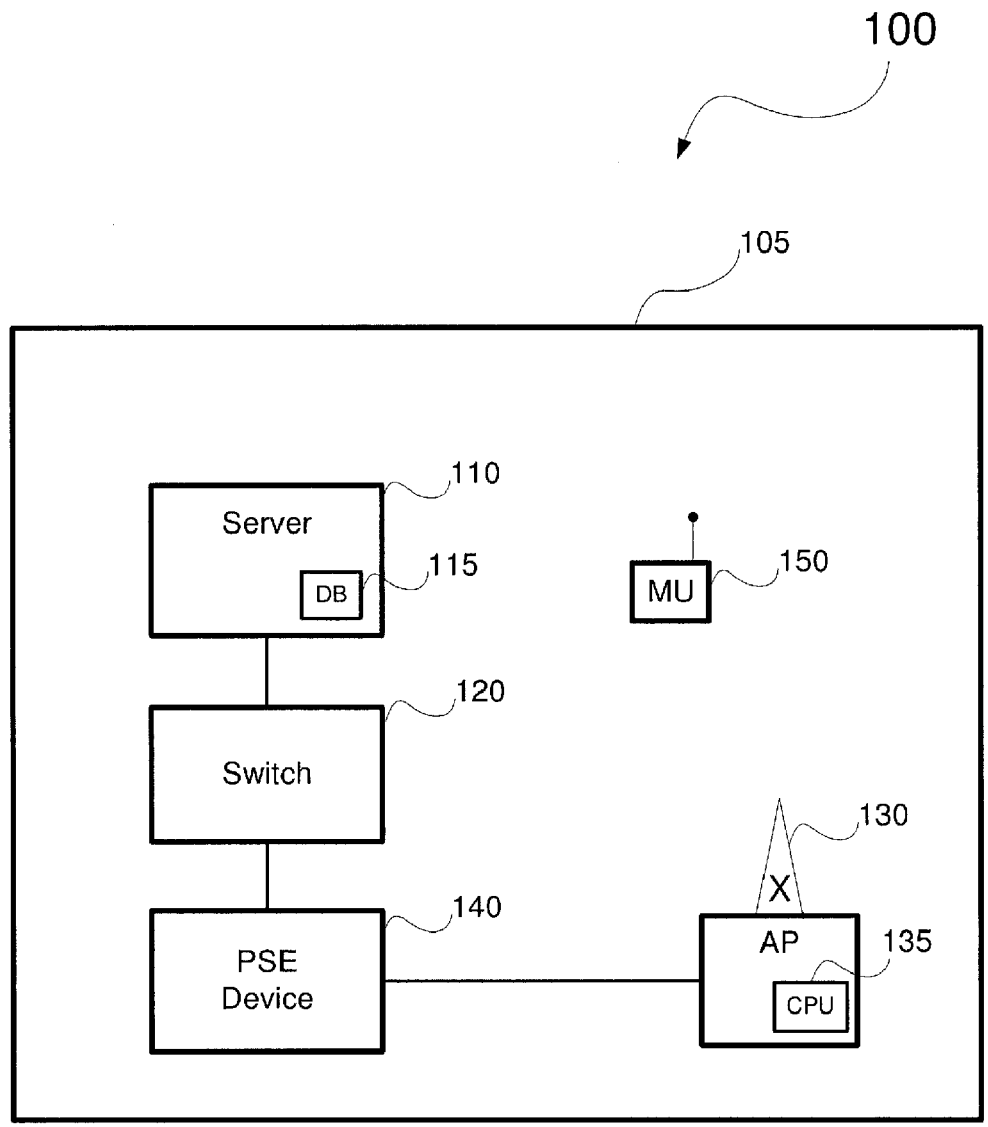
FIG. 1 shows an exemplary system for determining POE class capabilities according to an exemplary embodiment of the present invention.

The exemplary embodiments of the present invention may be further understood with reference to the following description and the appended drawings, wherein like elements are referred to with the same reference numerals. The exemplary embodiments of the present invention describe methods and systems for determining a class of power delivered via a power over Ethernet ("POE") source. Specifically, the methods and systems may determine the operating requirements of a powered device, such as an AP, based on the determined power available from power sourcing equipment ("PSE").

According to the exemplary embodiments of the present invention, one or more network access point ("AP") within a wireless communication network may be configured to receive power via POE, as set by the 802.3af and 802.3at standard bodies. In these power delivery standards, power may be categorized into classes. Accordingly, there may be a predetermined number of power classes for the AP, such as, for example, five power classes. These classes may define how much power may be delivered by the POE source. Specifically, a Powered Device ("PD") may receive this power from Power Sourcing Equipment ("PSE").

Advances in AP technology have enabled more advanced APs that may, for example, provide further functionalities. However, these APs require more power than older models of APs. When network switches that only provide standard 802.3af POE supplies are used, the advanced APs are not provided with sufficient power. In particular, standard 802.3af POE may provide less than 15 watts of power. An advanced AP connected to a PSE that provides such an inadequate amount of power will be unable to activate all its capabilities. A need thus exists to provide to the AP the ability to determine the amount of power that its connected PSE provides. If the AP determines that the PSE provides less power than necessary to activate all its resources, then the AP can determine which resources to turn on. It should be noted that while the standard 802.3 POE may provide 15 watts of power, there is no fixed minimum or maximum power standards. For example, the distance of an 802.3 cable may affect the amount of power delivered via a PSE device, wherein longer distances may reduce the power available due to cable-loss while conversely, shorter distances may increase the power available. Furthermore, PSE implementation may affect the minimum and maximum wattage delivered from the PSE device.

An AP of the network may be considered a PD in terms of the POE standard, wherein the PSE may be connected to, or otherwise in communication with, a network switch and AP in order to provide the AP power. Unfortunately, some APs may need more power to fully operate than the PSE is programmed to provide or capable to deliver. Therefore, the exemplary embodiments of the present invention allow for one or more APs to dynamically adjust the power level requirements of the AP based on the functionalities of that specific AP. The PSE, the switch, the AP, and the classes of power will be discussed in further detail below.

Those skilled in the art will understand that the term "AP" according to the present invention may also be used to describe access ports or any other device that is capable of receiving and transmitting wireless signals within a network in accordance with the principles and functionality described herein. Thus, the use of a wireless Access Point is only exemplary.

FIG. 1 shows an exemplary system 100 for determining POE class capabilities according to an exemplary embodiment of the present invention. The exemplary system 100 may utilize a WLAN architecture 105 to provide continuous wireless coverage throughout an operating environment. Thus, the WLAN 105 may be described as a network infrastructure that allows for wireless devices, such as a mobile unit ("MU") 150, to be in communication with the at least one AP 130 via radio waves. Those skilled in the art will understand that the system 100 is only exemplary and that the present invention may be applied to any type of wireless network topology, such as a local area network ("LAN"), a wide area network ("WAN"), a private area network ("PAN"), a virtual local area network ("VLAN"), etc.

The system 100 may include a server 110, a database 115, a switch 120, the at least one PD, such as AP 130, and at least one PSE device 140. It should be noted that while the PSE device 140 is illustrated as a separate component form the switch 120, alternative embodiments may of the system 100 may include the PSE device 140 as being a component within the switch 120. The server 110 may be responsible for the operations occurring within the WLAN 105. For example, the server 110 may associate authorized remote devices (e.g., MU 150) with the WLAN 105. The database 115 may store data relating to the WLAN 105 such as association lists. As will be discussed below, the database 110 may include a predetermined number of power classes (e.g., the classification power levels) relating to an allocation of power to the PSE device 140. While the exemplary system 100 includes the server 110, the switch 120, and the database 115, other topologies may be possible according to further exemplary embodiments of the present invention. For example, the PSE device 140 may be connected to the AP 130 via a separate connection, outside of the chain illustrated in FIG. 1.

According to the exemplary system 100, the switch 120 may direct data appropriately throughout the WLAN 105. For example, the signals transmitted from an associated remote device, such as the MU 150, may be determined by the switch 120 to be forwarded to the server 110. It should be noted that the delivery of power over an Ethernet cable is independent of the delivery of data of an Ethernet cable. While both data and power may be transfer, the exemplary embodiments of the present invention do not require the delivery of data to the AP 130. In other words, the PSE device 140 may simply provide power to the AP 130 without providing data to the AP 130. The switch 120 may be configured to control the standard 802.3af POE supplies based on a power classification. One skilled in the art would understand that the power classification may be described as a protocol for describing PD load requirements, wherein Class 0 is 0 watts to 12.95 watts, Class 1 is 0.44 watts to 3.84 watts, Class 2 is 3.85 watts to 6.49 watts, Class 3 is 6.50 watts to 12.95 watts, Class 4 is 12.95 watts to 30 watts, etc. Furthermore, the switch 120 may allow for sophisticated uninterruptible power management for vital devices throughout the exemplary system 100. As described above, there may not be any fixed minimum or maximum wattages for each of the classes. Various factures such as cable-loss and PSE implementation may increase or decrease these range values. For example, an increase in voltage maximum from the PSE device 140 may allow a Class 0 power classification to achieve 15 or 16 watts. Thus, the power classification ranges may not be standardize.

The exemplary WLAN 105 may incorporate the AP 130, as well as additional APs, to extend a coverage area, allowing the MU 150 to remain connected to the WLAN 105 in a greater number of locations. Accordingly, the AP 130 may contain an individual coverage area that is part of an overall coverage area of the WLAN 105. That is, the AP 130 may serve as an intermediary for a transmission from the MU 150 to the switch 120. As illustrated, the MU 150 may be wirelessly associated with the WLAN 105 via the AP 130. However, if the MU 150 roams to another coverage area, the MU 150 may be associated with the WLAN 105 via any other AP within the system 100. In addition, the AP 130 may be an advanced AP that requires more power to execute additional functionalities.

The PSE device 140 may be disposed between the switch 120 and the AP 130. As will be discussed in further detail below, the PSE device may provide a fixed amount of power to the AP 130 through the use of standard 802.3af POE supplies (i.e., less than 15 watts). Specifically, PSE device 140 may receive data from a first port of the switch 120 and power from a second port of the switch 120. Accordingly, the PSE device 140 may provide power to the AP 130 in a conventional manner at a specific power classification that is currently available to the device (e.g., Class 2).

The AP 130 may be considered a PD within the system 100. A PD may be described as a device that consumes power from a POE enabled Ethernet port, wherein the PD may be classified (e.g., Class 0, 1, 2, 3, 4, etc.) in order to indicate to the PSE the power range over which the PD will operate. The PD may draw a constant current during an applied voltage range to indicate its respective class. While the exemplary embodiments of the system 100 may refer to the PD as an AP, it should be noted that the present invention may be implemented on any Ethernet-connected equipment, such as a VoIP telephone, security cameras, etc. According to an exemplary embodiment of the system 100, the AP 130 may be a high-powered AP, requiring a higher level in power classification (e.g., Class 4). If an installer were to plug the high-powered AP 130 into a switch or PSE device that cannot supply Class 4 power, the AP 130 will not be given adequate power to operate all its functions.

As will be described in greater detail below, the exemplary embodiments of the present invention may first test the PSE device 140 to determine which power classifications are currently available to the AP 130. Specifically, a processor 135 (e.g., a central processing unit) within the AP 130 may ascertain what power operation is currently available from the PSE device 140. The processor 135 may be a low power circuit driven by a complex programmable logic device ("CPLD") or low power controller including an ability to store energy for a short period of time.

According to one embodiment, the AP 130 may include a board capacitor, such as a super capacitor (e.g., 0.5 Farad capacitor). This capacitor may be capable of holding a charge while power is unavailable or insufficiently supplied from the PSE device 140. The charge provided from the capacitor may provide the processor 135 with a period of time (e.g., 30 seconds) to determine and/or adjust the power operation of the AP 130. The AP 130 may further include a memory, such as an electrically erasable programmable read-only memory ("EEPROM"). This memory may allow the processor 135 to store and recall an operable power classification as the AP 130 adjusts its power requirements. In other words, as the processor 135 tests various power classifications, the processor 135 may write onto the memory each power class that allows the AP to operate 130. If the AP 130 is adjusted to require more power than that supplied by the PSE device 140, the memory may remember a previous operable power class and allow the processor 135 to revert back to that power class. Finally, the AP 130 may include a battery, such as a small lithium-ion battery, for operating the memory when power is unavailable or insufficiently supplied from the PSE device 140.

Thus, the processor may operate at a low power while it determines which resources of the AP 130 may be activated at any given the available power in order to begin operation (e.g., power up). If there is not enough power to enable key features of the AP 130, the AP 130 may trigger an alert to the server 110, and/or to a WLAN management unit.

Figure 2:
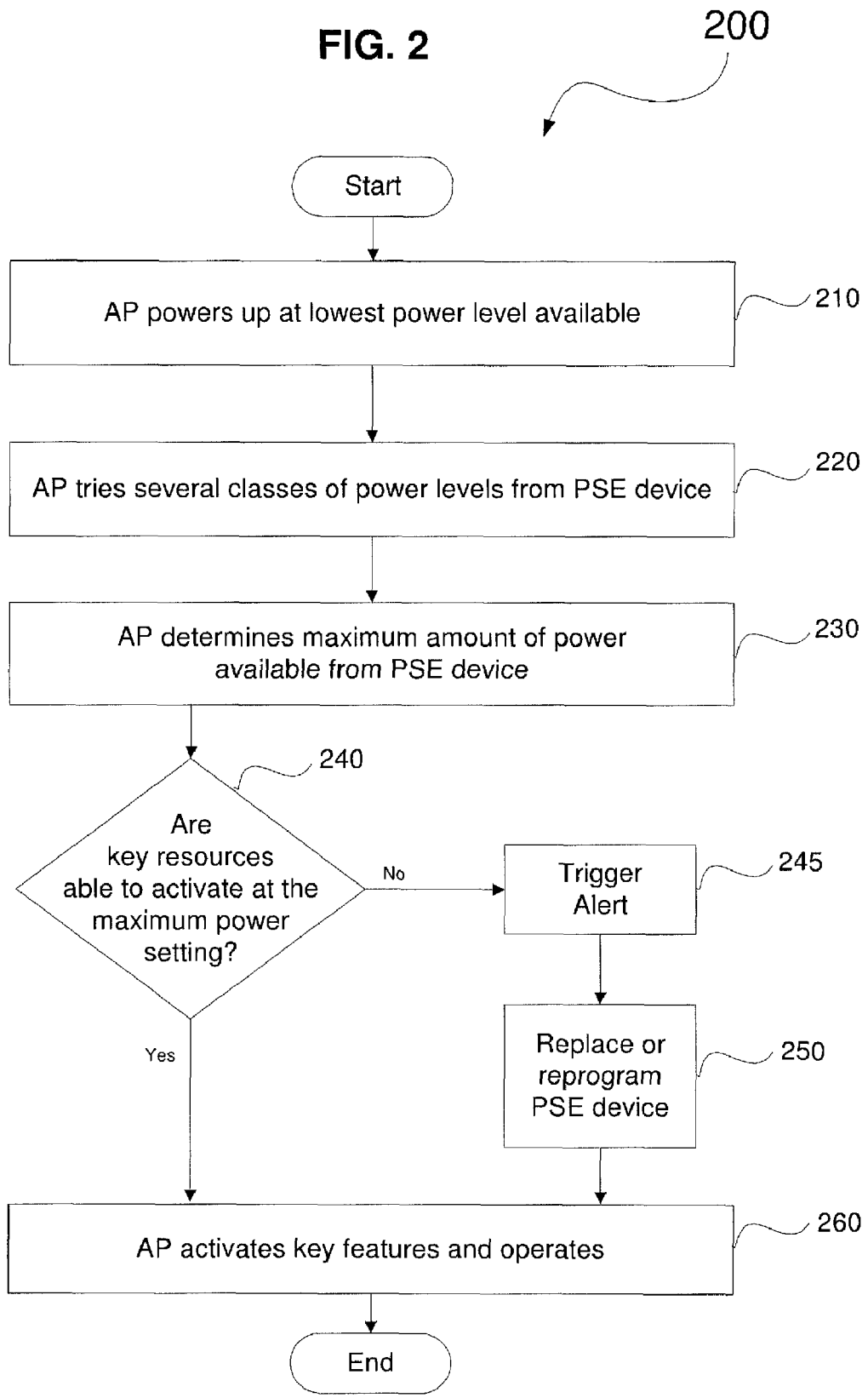
FIG. 2 shows an exemplary method for determining POE class capabilities according to an exemplary embodiment of the present invention.

FIG. 2 shows exemplary method 200 for determining POE class capabilities according to an exemplary embodiment of the present invention. The exemplary method 200 will be described with reference to the exemplary system 100 of FIG. 1. As described above, one or more APs within the system 100 may be considered PDs in terms of the POE standard, and may be connected to one or more PSE devices, such as the PSE device 140, for power. However, according to the exemplary embodiments of the present invention, the AP 130 may need more power that the PSE device 140 is capable of delivering.

In step 210, the AP 130 may power up at the lowest power available. Accordingly, the PSE device 140 may interrogate the AP 130 to ensure that it is POE-enabled. This period may be termed the detection phase. During the detection phase, the PSE device 140 may apply a voltage ramp to the AP 130 and search for a signature impedance from the load (e.g., 25 kΩ). If the correct impedance is not detected, the PSE device 140 may presume that the load is not POE-enabled and shuts down the POE sending end, and the connection may then operate as a standard Ethernet connection.

However, if the signature impedance is detected, the PSE device 140 may move on to the classification phase. The signature identification voltage may be a ramp voltage between 2.5V and 10V, and a 24.9 kΩ resistor may provide the correct signature impedance for detection. During the classification phase, the PSE device 140 may continue to ramp the voltage to the AP 130. For example, the classification phase may occur between 15V and 20V. During this voltage transition, the AP 130 may draw a specified current to identify a power classification. Since the AP 130 may be powered up at the lowest power available, the AP 103 may be identified as operating in Class 0. For example, Class 0 may be implemented through the use of the 24.9 kΩ signature resistor. After the classification phase, the PSE device 140 may continue to ramp the input voltage up to 30 V, and the AP 130 is then allowed to power up.

In step 220, the AP 130 may try several classes of power available from any PSE device. Specifically, the processor 135 of the AP 130 may adjust the signature impedance of the AP 130 in order to change the power classification detected by the PSE device 140. In other words, AP 130 may indicate its power requirements to the PSE 140 at various power level requirements. As described above, the power classification may describe the amount of power the AP 130 will require during normal operation. Accordingly, this information is fed to a controller of the PSE device 140 to allow the device to determine power budget requirements. Thus, the AP 130 may increase its power level requirement from a Class 0 power requirement to a Class 1 power requirement to a Class 2, etc. It should be noted that each instance where the AP 130 changes from one Class to another, the AP 130 may stop drawing power from the PSE device 140. In other words, the AP 130 may not change from a Class 0 power requirement to a class 1 power requirement without restarting the AP 130. Therefore, the AP 130 may be powered down (e.g., turned off), or otherwise disconnected from the PSE device 140. By allowing the AP 130 to power down, the AP 130 may switch to a different Class requirement prior to receiving power from the PSE device 140. Once the power class requirement has been changed, the AP 130 may start up and resume drawing power from the PSE device 140 according to the new power classification.

In step 230, the AP 130 may determine the maximum amount of power available from the PSE device, or from a combination of PSE devices. Specifically, as the AP 130 may increase the sense resistance at higher voltages, the processor 135 may detect whether the PSE device 140 is capable of providing power. For example, the AP 130 may require Class 4 power, while the PSE device 140 may only supply up to Class 2 power. Therefore, as the AP 130 increase the power level requirement from Class 0 to Class 1, and so forth, the processor 135 may determine that the PSE device 140 is incapable of providing power over Class 2. Thus, the AP 130 determines that Class 2 power is the maximum amount of power available from the PSE device 140. It should be noted that the AP 130 may be connected to a plurality of PSE devices. Thus, the processor 135 may determine the maximum amount of power from the combined PSE devices.

In step 240, the AP 130 may determine what resources may be activated under the selected power classification. Specifically, processor 135 of the AP 130 may determine if there is enough power to enable any key features of the AP 130. If there is not enough power, then in step 245, the AP 130 may trigger an alert to the server 110 and/or a network manager. The method may then advance to step 250. However, if there is enough power to enable the key features of the AP 130, the method may advance to step 260.

In step 250, the AP 130 may determine if the PSE device 140 has been replaced or reprogrammed to provide greater power. According to one embodiment, a network manager may respond to the alert and adjust the output setting of the PSE device 140. If the PSE device 140 is incapable of achieving the required power level, the PSE device 140 may be replaced with a higher output powered device. Alternatively, one or more additional PSE devices may be connected or activated in order to achieve an adequate output power required by the power classification of the AP 130.

In step 260, the AP 130 may activate the key features and operate accordingly. Accordingly, the exemplary method 200 may be used to determine what resources can be activated under any selected class power restrictions until a time where the PSE device 140 is capable of providing adequate power.

This method 200 may improve installation troubleshooting for the AP 130, as well as any further APs installed throughout the WLAN 105.

FIG. 3 shows a table 300 of predetermined number of power classes, or the classification power levels, relating to an allocation of power to the AP 130 from the PSE device 140 according to an exemplary embodiment of the present invention. Accordingly, the table 300 may be stored in the database 115 of the server 110 for referring power classifications. As described above, the PSE device 140 and the AP 130 may work together to determine the nature of the power level requirements and apply power to the POE-enabled AP 130. The processor 135 of the AP 130 may adjust the power level requirement of the AP 130. Once power is received from the PSE device 140 at a specific classification, the processor 135 may test the PSE device 140 as to which power classifications are available and allocate power according to the operational needs hierarchy of the AP 130.

Figure 4:
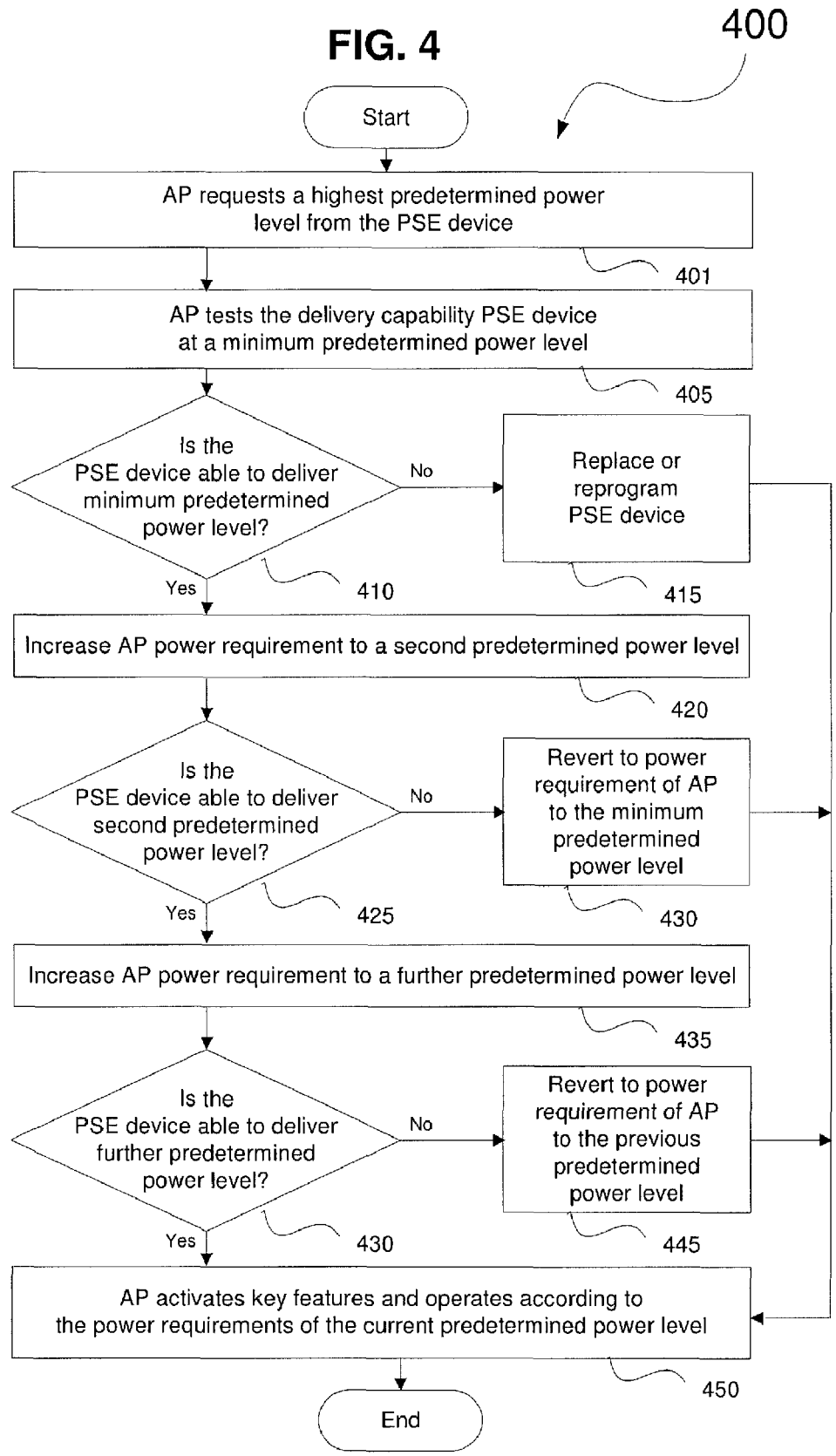
FIG. 4 shows a further exemplary method for determining POE delivery capabilities according to an exemplary embodiment of the present invention.

FIG. 4 shows a further exemplary method for determining POE delivery capabilities according to an exemplary embodiment of the present invention. As opposed to the AP 130 inquiring the PSE device 140 about various power classifications that are available, the AP 130 may test predetermined increments of power levels. Initially, in step 401, the AP 130 may request a highest predetermined power level from the PSE device 140. For example, the AP 130 may request Class 4 power (e.g., 30 Watts) from the PSE device 140. As described below, in steps 405-430, the AP 130 may perform a plurality of load tests at predetermined power levels in order to determine if the AP 130 can draw a known power from the PSE device 140. In other words, the AP 130 may continue to increase a power level requirement to determine the POE delivery capabilities of the PSE device 140. Thus, the AP 130 may adjust its operating parameters based on this determined POE delivery capability. These operating parameters may include the number of antenna in operation at the AP 130, the transmission power supplied to the one or more antennas, the number of communication channels available from the AP 130, the number of operable Ethernet ports, etc.

In step 405, the AP 130 may initially test a minimum power level from the PSE device 140. For example, the AP 130 may power up at 13 Watts. In step 410, a determination may be made as to whether the PSE device 140 can sustain a sufficient power level required by this first predetermined power level. If the PSE device 140 is able to deliver this minimum power level, the method 400 may advance to step 420. However, if the PSE device 130 is incapable of achieving the first predetermined power level, the method may advance to step 415.

In step 415, the PSE device 140 may be replaced or reprogrammed to provide greater power. As described above in method 300, an alert may be trigger when the PSE device 140 is unable to provide sufficient power to the AP 130. Accordingly, a network manager may respond to the alert and adjust the output setting of the PSE device 140, or replace the PSE device 140. Once the PSE device 140 is replaced or reprogrammed, the method 400 may advance to step 450.

In step 420, the AP 130 may increase power to a second predetermined power level. For example, the AP 130 may power up from 13 Watts to 17 Watts. In step 425, a determination may be made as to whether the PSE device 140 can sustain a sufficient power level required by this second predetermined power level. If the PSE device 140 is able to deliver this second power level, the method 400 may advance to step 435. However, if the power is incapable of achieving the second power level, the method may advance to step 430.

In step 430, the AP 130 may revert to the power requirement of the first predetermined minimum power level. For example, the power requirement for the AP 130 may be decreased from 17 Watts back to 13 Watts. Since the PSE device 140 is unable to achieve 17 Watts of power, the method 400 allows the AP 130 to presume that the first level of power (13 Watts) is the highest level deliverable from the PSE device 140. Accordingly, the method 400 may then advance to 450, wherein the AP 130 activates key features and operates according to the power requirements of the minimum power level (e.g., at 13 Watts). Specifically, the AP 130 may only be capable of activating key features and operations while receiving the minimum power level from the PSE device 140. For example, the AP 130 may deactivate one or more antennas, decrease transmission power supplied to the antenna(s), deactivate one or more Ethernet ports, etc.

In step 435, the AP 130 may increase power to a further predetermined power level (e.g., a third power level). For example, the AP 130 may power up at 24 Watts. In step 440, a determination may be made as to whether the PSE device 140 can sustain a sufficient power level required by this further predetermined power level. If the PSE device 140 is able to deliver this further power level, the method 400 may advance to step 450, wherein the AP activates key features and operates according to the power requirements of the further class (e.g., at 24 Watts). However, if the power is incapable of achieving the further power level, the method may advance to step 445.

In step 445, the AP 130 may revert to the power requirement of the previous power level (e.g., the second predetermined power level). For example, the power requirement for the AP 130 may be decreased from 24 Watts back to 17 Watts. Since the PSE device 140 is unable to achieve 24 Watts of power, the method 400 allows the AP 130 to presume that the second power level (17 Watts) is the highest level deliverable from the PSE device 140. Accordingly, the method 400 may then advance to 450, wherein the AP 130 activates key features and operates according to the power requirements of the second power level (e.g., at 17 Watts). Specifically, the AP 130 may be capable of activating additional key features and operations while receiving the second power level from the PSE device 140. For example, the AP 130 may activate one or more additional antennas, increase transmission power supplied to the antenna(s), activate one or more Ethernet ports, etc.

Finally, in step 450, the AP 130 may activate key features and operates according to the power requirements of the current predetermined power level. As described above, the utilization of certain operations and features of the AP 130 may be limited due to the level of power deliverable from the PSE device 140. As the AP 130 tests the power level requirements of the AP 130 and increases the draw of power from the PSE device 140, the AP 130 may activate additional features and operations accordingly. If it is determined that the PSE device 140 can deliver the maximum power requirement of the AP 130, then the AP 130 may operate to its fullest capacity (e.g., activate every antenna, maximize transmission power supplied to the antenna(s), operate on additional communication channels, activate Ethernet ports, etc.).

It should be noted that while the method 400 illustrated in FIG. 4 includes first, second, and further predetermined power levels, any number of incremental power levels (e.g., a fourth level, a fifth level, etc.) may be implemented according to the exemplary embodiments of the present invention. In addition, these incremental increases in power levels may be assigned to any power value, or power wattage. In other words, the predetermined power levels are not limited to 13 Watts, 17 Watts, and 24 Watts. An increase in the wattage of any value may be implemented according to the exemplary embodiments of the present invention.

Furthermore, the exemplary embodiments are not limited to the use of incremental power levels. For example, the AP 130 may simply "ramp-up" its power requirement. This ramping-up may be achieved by gradually increasing power requirement of the AP 130 from a lowest initial value to any maximum value. Therefore, as the AP 130 ramps up the power to any wattage, a determination may be made as to whether sufficient power is available from the PSE device 140 at that particular wattage. Thus, any number of tests may be performed at any number of power values (i.e., wattages) in order to ascertain what power operations are available at the AP 130 based on the power supplied from the PSE device 130.

It should be noted that the while the PSE device 140 is described as a separate unit from the switch 120, the PSE device may be incorporated into the switch 120. In such an exemplary embodiment, two Ethernet cables may run to the AP 130 from the PSE device 140 that is part of the switch 120. Thus, the PSE device 140 may be a module within the switch 120. Furthermore, the power provided by the PSE device 140 may be changed by reprogramming the PSE device 140 or by replacing the PSE device 140 with another PSE device outputting a different power classification. It should also be noted that the use of two or more PSE devices 140 may be combined to generate the higher power output required by the AP 130. Furthermore, the PSE device(s) 140 may include additional ports in order to receive further power supplies. Thus, the combines PSE devices may then generate an even higher power output to power the AP.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    operating a network device from a power source at a lowest power level;
    applying a voltage ramp to the network device by the power source;
    detecting from the network device a signature impedance indicating that the network device is Power-over-Ethernet enabled;
    if the network device is found to be Power-over-Ethernet enabled, continuing to ramp the voltage on the signature impedance and measuring a current draw of the network device;
    identifying a class of power level of the network device dependant on the applied voltage and current draw;
    powering down and then powering up the network device at the identified power level;
    determining whether one or more features of the network device can be activated at the identified power level;
    operating the network device at the identified power level if at least one feature of the network device can be activated at the identified power level; and
    activating an alert to a network manager if at least one feature of the network device cannot be activated at the identified power level.

2. The method of claim 1, further comprising:
    upgrading the power source by the network manager to provide more power after alert activation.

3. The method of claim 1, further comprising:
    performing a plurality of load tests of the power source at predetermined power levels by the network device, determining if the network device can draw one of the predetermined power levels from the power source, and adjusting the network device operating parameters based on the one of the predetermined power levels.

4. The system of claim 3, wherein the performing step includes increasing a sense resistance at higher voltage load tests, and the determining step includes determining a maximum amount of power available from the power source.

5. The method of claim 1, wherein the network device is operable at a plurality of different predetermined power level classes, and wherein the network device adjusting its signature impedance to change its identified class of power level.

6. A system, comprising:
    a network device operable at a lowest power level, and operable;
    a power source operable for; providing a lowest power level to a network device; applying a voltage ramp to the network device by the power source; detecting from the network device a signature impedance indicating that the network device is Power-over-Ethernet enabled; if the network device is found to be Power-over-Ethernet enabled, continuing to ramp the voltage on the signature impedance and measuring a current draw of the network device; identifying a class of power level of the network device dependant on the applied voltage and current draw; and powering down and then powering up the network device at the identified power level; and
    a network device operable at the lowest power level and then the identified power level, wherein the network device is operable for; determining whether one or more resources features of the network device can be activated at the identified power level; operating at the identified power level if at least one feature of the network device can be activated at the identified power level; and activating an alert to a network manager if at least one feature of the network device cannot be activated at the identified power level.

7. A network device, comprising:
    means for operating at a lowest power level from a power source;
    means for receiving an applied voltage ramp from the power source;
    means for detecting a signature impedance indicating that the network device is Power-over-Ethernet enabled;
    means for receiving a continuing voltage ramp on the signature impedance and measuring a current draw if the network device is found to be Power-over-Ethernet enabled;
    means for identifying a class of operating power level dependant on the applied voltage and current draw;
    means for powering down and then powering up at the identified power level;
    means for determining whether one or more features of the network device can be activated at the identified power level;
    means for operating operates the device at the identified power level if at least one feature of the network device can be activated at the identified power level; and
    means for activating an alert to a network manager if at least one feature of the network device cannot be activated at the identified power level.

* * * * *

UNITED STATES PATENT AND TRADEMARK OFFICE
CERTIFICATE OF CORRECTION

PATENT NO. : 8,225,124 B2  
APPLICATION NO. : 12/182580  
DATED : July 17, 2012  
INVENTOR(S) : Geiger et al.

Page 1 of 1

It is certified that error appears in the above-identified patent and that said Letters Patent is hereby corrected as shown below:

In the Drawings:

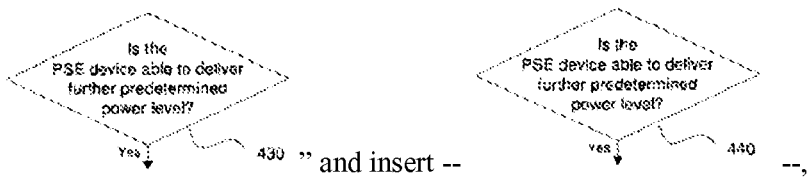

In Fig. 4, Sheet 4 of 4, delete " " and insert -- --, therefor.

In the Claims:

In Column 10, Line 5, in Claim 4, delete "system" and insert -- method --, therefor.

Signed and Sealed this  
Sixteenth Day of July, 2013

Teresa Stanek Rea  
*Acting Director of the United States Patent and Trademark Office*